United States Patent Office 3,248,715

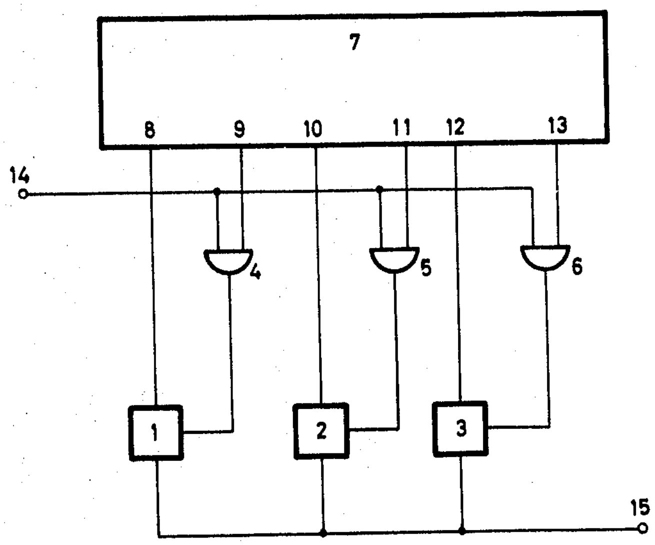
7
8
9
10
11
12
13
14
4
5
6
1
2
3
15

Patented Apr. 26, 1966

3,248,715

ARRANGEMENT FOR THE SUCCESSIVE STORAGE AND CORRESPONDING RELEASE OF INFORMATION PULSES

Karl Euler, Munich, Germany, assignor to Siemens & Halske Aktiengesellschaft, Berlin and Munich, Germany, a corporation of Germany Filed Jan. 15, 1962, Ser. No. 166,103
Claims priority, application Germany, Jan. 27, 1961, S 72,239
2 Claims. (Cl. 340—174)

The invention disclosed herein relates to the storage of information and is particularly concerned with an information storage arrangement.

It is known to employ so-called shift registers for the shifting of information, consisting of a plurality of information units (bits) or for delaying such information by a given number of timing intervals. In the case of shift registers in which magnetic cores with rectangular hysteresis loop are utilized as storage elements, the information units or bits are in known manner stored in the form of positive or negative remanence. A so-called shift impulse must be conducted to a magnetic core whenever information stored therein is to be shifted further to a successive magnet core. The purpose of the shift impulse is to magnetize the magnetic core in a predetermined direction. Such change of magnetization, hereinafter also referred to as tipping of a core, induces voltages in known manner, in all windings of a magnetic core, owing to the flux alterations caused thereby, and such voltages effect a current flow in circuits connected to the respective windings. The current flow extending from the output winding of a tipped magnetic core to the input winding of the next successive magnetic core, effects magnetization of the successive core in the direction of magnetization which prevailed in the preceding core before the tipping thereof. An information bit is in this manner shifted by one stage of the shift register. However, a similar operation can also be effected with the aid of storage elements other than magnetic cores with rectangular hysteresis loop. The operating principles utilized in connection with shift registers have been known for a relatively long time.

Another storage arrangement has become known, having properties similar to that of shift registers, but operating in accordance with an entirely different principle. As compared with the previously known customary shift registers, an information unit or bit is not shifted from stage to stage as in the customary shift registers, but is fixedly stored in a storage element, for example, in a magnetic core, and such bit is released from the corresponding core only after the lapse of a desired delay interval. The individual information bits which form parts of an information total and which follow successively in series operation, are in such a storage arrangement successively fixedly stored by cyclical triggering of the storage elements or members, and are upon termination of the storage time again released in proper placing, by cyclical triggering of the storage members. The great advantage of such a storage arrangement, as compared with customary shift registers in which the information is shifted from storage member to storage member, resides in that the storing of an information unit requires setting of only one storage element, only once, in accordance with the information which is to be stored, while true customary shift registers require that all storage members be set once for the storing of an information unit. The improved storage arrangement which differs from the customary shift registers as indicated above, provides for the cyclical triggering of the storage members, that is, for the triggering thereof successively as to time, a timing distributor which comprises a number of outputs corresponding at least to the number of storage elements or members.

In this prior improved storage arrangement, whenever an information unit is stored in a storage member, while an information unit is at the same time released from a successive storage member, there appear at the output line which is common to all storage members, interference pulses caused by the storing of impulses and simultaneously also the released impulses which are to be operatively utilized. These two simultaneously occurring kinds of impulses can be distinguished by making the amplitude of the operatively utilized impulses greater than that of the interference pulses and by suppressing the latter with the aid of members which form a threshold value. Another possibility of suppressing the interference pulses resides in inversely connecting the output or readout line with each second storage member, thereby effecting mutual compensation of the interference pulses produced by the storing operations. The drawback of such a mode of suppression of interference pulses resides in that the impulses which come from the storage members, for example, from the magnetic cores, and which are to be operatively utilized, are bipolar pulses, requiring complicated readout and cycling amplifiers, respectively.

The problem and object underlying the present invention is to avoid this disadvantage of the previous storage arrangement. According to the invention, this is accomplished by effecting the storing and the release of information units or bits at different timing intervals. A timing distributor is for this purpose advantageously used, such timing distributor giving off an impulse to a storage member always for each two successive timing intervals, the first of said impulses serving for the release of a stored information unit and the second impulse serving for the storing of a new information unit. The result of this measure is that the interference pulses caused by the storing operation appear on the common output line at different instants than the readout or operatively utilized impulses. This eliminates measures such as different amplitude of the interference pulses and the operatively utilized or working pulses, as well as the members connected therewith for forming a threshold value, or employing a particular circuitry for an interference impulse compensation.

Further details of the invention will appear from the description of the circuit shown in the accompanying drawing representing the principles employed in constructing a storage arrangement according to the present invention.

The arrangement comprises storage members or elements 1, 2, 3, as well as coincidence gates 4, 5, 6 and a timer 7 having outputs 8, 9, 10, 11, 12 and 13. The information units which are to be stored are extended to the arrangement over the input 14, such units are upon release taken off at the output.

The arrangement operates as follows:

It shall be assumed that there is initially no information unit stored in any of the storage members 1, 2, 3, and that the information 110 is to be delayed by three timing intervals or timing instants. An impulse for the first timing instant is supplied at the output 8 of the timer 7, such impulse attempting to release an information unit stored in the storage member 1. However, since it was assumed that no information unit had been stored in this storage member, no impulse can appear at the common output line 15. Another impulse for the second timing instant is supplied to the output 9 of the timer 7. Synchronously with this timing pulse at the output 9, there appears at the common input line 14 the first impulse of the information 110 which is to be delayed. The simultaneous appearance of these impulses at the two inputs of the coincidence gate 4 triggers the storage member 1 and the first information unit is thus stored therein. At the output 10 of the timer 7 will then appear the impulse for the third timing instant, such impulse attempting to release an information unit stored in the storing member 2, in the same manner as the first timing pulse at the timer output 8 attempted to release an information unit from the storage member 1. Again, since there is no information unit stored in the member 2, no impulse will appear at the terminal 15 of the common output line. An impulse for the fourth timing instant will now appear at the timer output 11 coinciding with the second information unit which appears simultaneously at the terminal 14 of the common input line, thus making the coincidence gate 5 conductive and causing storage of such second information unit in the storage member 2. The fifth timing pulse appearing at the timer output 12 is again unproductive so far as the release of an information unit from the storage member 3 is concerned, since no such unit had as yet been stored therein. The sixth timing impulse at the timer output 13 coincides with the last information unit, assumed to correspond to O, of the information to be delayed; however, since this last place of the information is not represented by an impulse on the terminal 14 of the common input line, the coincidence gate 6 remains blocked and the storage member 3 will remain in its inactive condition.

A timing impulse will thereupon again appear at the timer output 8, representing the first timing impulse of a new timing cycle. This impulse effects release of the information unit stored in the storage member 1, and a corresponding impulse will accordingly appear at the terminal 15 of the common output line.

The storing of new information units is effected as described before.

The information unit stored in the storage member 2 is released by the action of a timing pulse at the timer output 10. The timing impulse at the timer output 12 remains ineffective since no impulse representing an information unit 1 had been stored in the storage element 3.

Accordingly, there will appear at the terminal 15 of the common output line, an information delayed by $2n-1$ timing instants or intervals of the timer 7, with the information units in the same sequence in which such units were extended to the terminal 14 of the common input line.

It is to be noted that each two timing instants of the timer 7 correspond to a timing interval such as is present between two successive information units. It is of couse possible to dispose in the common output line an appropriate corresponding delay element for the purpose of giving off the impulses of an information, which had been delayed by the operation of the storage arrangement, in proper timing with respect to the undelayed impulses, that is, after $2n$ timings of the timer.

The storage members 1, 2, 3 as well as the coincidence gates 4, 5, 6 can be realized in most varied known ways. A particularly advantageous embodiment can be realized by combining in known manner any given coincidence gate with the storage member or element cooperatively associated therewith so as to form a structural component, comprising a magnetic core with rectangular hysteresis loop, thus resulting in a particularly simple construction for the storage arrangement according to the invention.

Changes may be made within the scope and spirit of the appended claims which define what is believed to be new and desired to have protected by Letters Patent.

I claim.

1. An arrangement for successively storing information bits successively conducted thereto in the form of impulses and for successively releasing stored bits after the lapse of a predetermined time interval, in the sequence in which said bits had been conducted thereto, comprising a common input line over which bits are in the form of information pulses successively conducted for the temporary storage thereof, a plurality of members for storing individual bits, a plurality of coincidence gates corresponding in number at least to the number of storing members, each coincidence gate having a first and a second input and an output, circuit means for connecting the first inputs of said coincidence gates in parallel to said common input line, circuit means for connecting the output of each coincidence gate for cooperation with one of said storing members, cyclically operating timing means for placing a control pulse during a first timing interval at successive timing instants on the second inputs of said coincidence gates, each respective control pulse in phase with an information impulse conducted to said common input line, whereby the respective coincidence gates become conductive to effect successive storage of the respective information impulse in the corresponding storing member, a common output line, means for connecting the outputs of said storing members in parallel to said output line, and means for placing a control pulse during a second timing interval at successive timing instants falling between said first-mentioned timing instants on said storing members to effect successive release, over said common output line, of the information bits stored therein.

2. An arrangement for successively storing information bits successively conducted thereto in the form of impulses and for successively releasing stored bits after the lapse of a predetermined time interval, in the sequence in which said bits had been conducted thereto, comprising a common input line over which bits are in the form of information pulses successively conducted for the temporary storage thereof, a plurality of members for storing individual bits, a plurality of coincidence gates corresponding in number at least to the number of storing members, each coincidence gate having a first and a second input and an output, circuit means for connecting the output of each coincidence gate for cooperation with one of said storing members, a common output line, means for connecting the outputs of said storing members in parallel to said output line, a cyclically operating timer having a number of timing outputs which equals twice the number of storing members and giving off an impulse to one and the same storing member in any two successive timing intervals, one of such impulses forming a control pulse during a first timing interval at successive timing instants on the second inputs of said coincidence gates, each respective control pulse in phase with an information impulse conducted to said common input line, whereby the respective coincidence gates become conductive to effect storage of the respective information impulse in the corresponding storing member, and the other impulse of such a pair forming a control pulse during a second timing interval at successive timing instants on said storing members to effect release, over said common output line, of the information bits stored therein, the sequentially first of said impulses serving for the release of the information pulse stored in the respective storing member and the sequentially second impulse serving jointly with the operation of the respective cooperating coincidence gate for the storing of a new information impulse.

References Cited by the Examiner

UNITED STATES PATENTS

| | | | |
|---|---|---|---|
| 3,016,196 | 1/1962 | Mallery | 340—174 X |
| 3,127,590 | 3/1964 | Euler | 340—174 |

IRVING L. SRAGOW, *Primary Examiner.*